Figure 1:
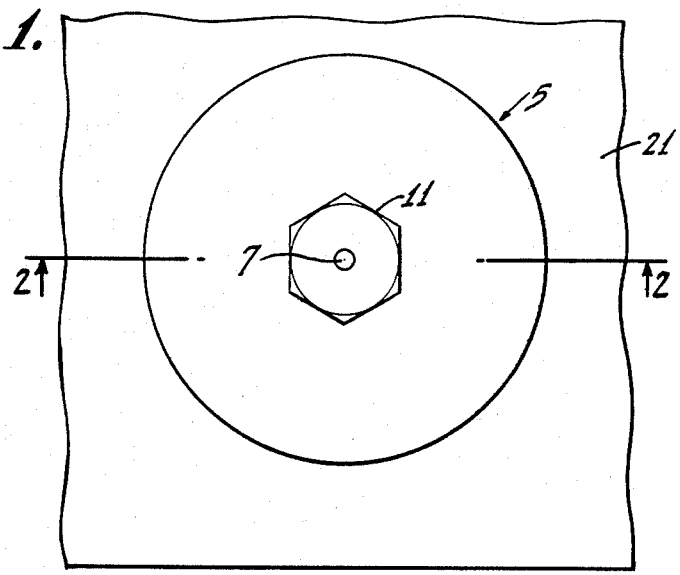

INVENTOR.
RICHARD M. MISON
BY Eugene M. Whitacre
ATTORNEY

United States Patent Office 3,175,136
Patented Mar. 23, 1965

3,175,136
CONCENTRIC-VANE VARIABLE CAPACITOR
WITH SEAL
Richard M. Mison, Bethel Park, Pa., assignor to Radio Corporation of America, a corporation of Delaware
Filed Jan. 10, 1962, Ser. No. 165,336
8 Claims. (Cl. 317—251)

The present invention relates to variable capacitors of the type used in tuned signal circuits for individually adjusting the tuning or frequency response thereof, and most often used as trimmer capacitors. These are of relatively small size and are generally of the open, air-dielectric type with relatively-movable plates or vane elements to provide capacity variation over a limited range. While such capacitors may be used as fixed or variable capacity elements in any signal circuit, they are most often used in parallel with other variable circuit tuning elements, such as main variable tuning capacitor sections, to trim or adjust the individual circuit tuning within a limited range.

It is an object of this invention to provide an improved variable capacitor of the air-dielectric concentric-vane open type which is effectively sealed and vibration proof, and which is adapted for printed board mounting with other circuit components.

Concentric-vane variable capacitors, of the type to which the invention relates more particularly, comprise outer and inner concentric cylindrical or tubular vane elements, or sets of elements, intermeshed and relatively movable longitudinally and in spaced relation along a common axis to vary the extent of meshing, and the effective spacing, for capacity variation therebetween.

It is a further object of this invention to provide an improved concentric-vane type trimmer or variable capacitor, for tunable signal circuits and the like, having sealing, damping and locking means for sealing out moisture and dust from between the two capacity or tuning elements thereof, and for effectively damping and preventing unintentional relative movement of said elements due to mechanical vibration and/or acoustical feedback and the like, in operation.

In accordance with the invention, an open concentric-vane type variable capacitor is provided with a stretched flexible-walled tubular sealing, locking and vibration-damping element carried by the (outer) one of the two concentrically-mounted relatively-movable spaced tubular tuning elements on the outer surface thereof and extending freely therefrom at one end into overlapping contracted frictional engagement with the outer surface of the other, (inner one) of said tuning elements.

Thus the outer surface of the one set or element, of the two intermeshed capacitor elements or sets of elements, carries a flexible contracting sleeve or band of plastic tubing, or other insulating material, which is made to extend and overlap onto the outer surface of the other set or element to form both a dust seal and frictional holding and damping means against undesired relative movement tending to disturb the capacity setting or tuning adjustment.

This construction thus serves (1) to seal out dust and moisture in a low-cost open-type trimmer capacitor structure, (2) to increase the friction between the fixed and moving elements or sets of vanes, thus forming a locking device to prevent unintentional movement and change of adjustment due to mechanical vibration, and (3) to provide effective damping action against acoustic or sound vibration and feedback in operation.

The contracting sleeve is preferably relatively-thin and elastic, surrounding and gripping the one outer capacitor element firmly with sufficient overhand to make full sealing and frictional contact with the other inner element. Thus effectively it has a shrink fit over an area of the one or outer element and a frictional, limited, end contact with the other or inner element. If the sleeve is made of heat-shrinking tubing, the inside diameter of the sleeve can be substantially the same size as the outer diameter of the outer element and will shrink to form a frictional seal and mechanical lock and damping means on the inner element when heat is applied. Base and terminal means are provided for suitable mounting and connection with associated circuit elements, including printed circuit boards and the like.

The invention will, however, be further understood from the following description of a presently-preferred embodiment thereof, when considered in connection with the accompanying drawing, and its scope is pointed out in the appended claims.

Figure 2:
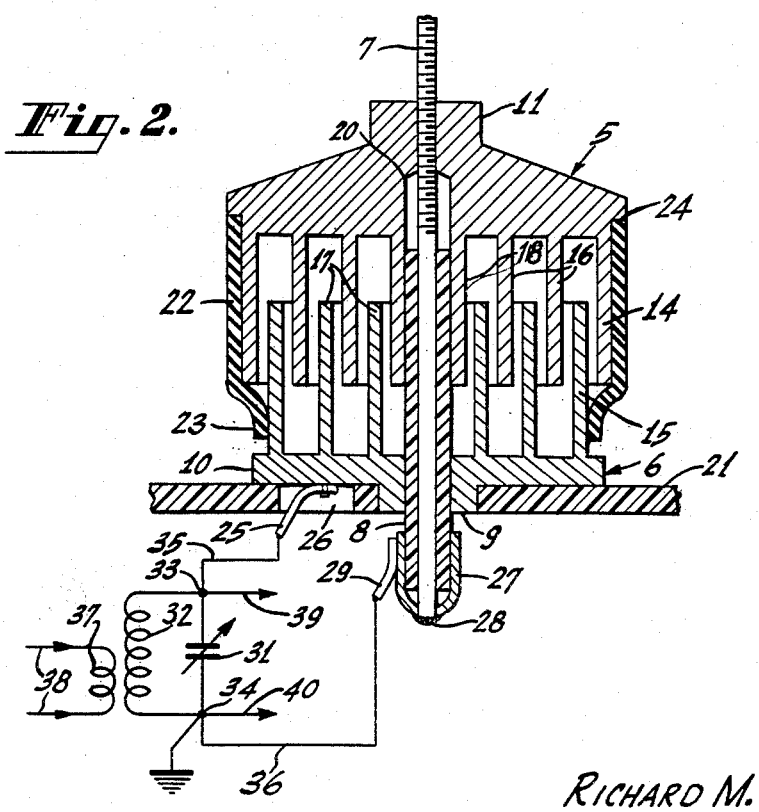

In the drawing,

FIGURE 1 is a top view, on a greatly enlarged scale, of a trimmer capacitor embodying the invention, and FIGURE 2 is a cross-sectional view, in elevation, of the capacitor of FIGURE 1, taken on the section line 2—2, showing details of construction thereof in accordance with the invention and schematic tuning circuit connections therewith, showing one of its uses.

Referring to the drawing, the variable trimmer capacitor comprises outer and inner relatively-movable metallic or conductive capacitor elements 5 and 6 respectively, of the concentric cylindrical or tubular type, mounted in coaxial intermeshing relation for relative movement along a common longitudinal fixed axis provided by central guide means. The latter includes an axial metallic guide rod 7 and a surrounding tubular guide pin 8 of insulating material, and is rigidly mounted in a central boss 9 in the circular base 10 of the element 6. The guide rod 7 is surrounded by the pin 8 for a portion of its length and its free outer end is threaded to receive the element 5 which is correspondingly center-threaded to rotate thereon and thus to move toward and away from the element 6 and gradually vary the capacity and tuning adjustment of the unit. The outer element is provided with an operating nut or knob 11 of hexagonal form as indicated more clearly in FIGURE 1. This may be attached to the body of the element 5, or made integral therewith. It should be understood that the capacitor shown is relatively small in size although shown enlarged to better illustrate its construction. In the present example, it may be less than one-half inch in diameter and only slightly greater in length.

Referring more particularly to FIGURE 2, it will be seen that each of the intermeshed capacitor elements or sets of elements, 5 and 6, comprises one or more cylindrical or tubular vanes or plates, such as outer vanes 14 and 15 and successive inner vanes 16 and 17, respectively. An innermost tubular vane 18 for the element 5 is provided as a sleeve having a smooth running fit over the tubular pin or guide element 8, as shown more clearly in FIGURE 2, whereby rotation and movement of the entire set of vanes carried by the element 5, along the threaded rod 7, is substantially rigidly guided by the elements 8 and 18. The element 5 is counter-bored as indicated at 20 to provide a recess for the element 8 as the two capacitor elements 5 and 6 move into full meshing engagement and maximum capacity position.

The capacitor element 6 in the present example is relatively fixed, being mounted on a printed-circuit board or the like, as indicated at 21. Thus the capacitor element 5 becomes the movable element in the present example. The central boss 9 serves to hold the tuning capacitor in place in the board as indicated, although any other suitable mounting arrangement may be made as is determined by the use of the capacitor in various circuits.

The outer or movable capacitor element 5 carries a flexible contracting bridging sleeve 22 of plastic or like insulating material which extends and overlaps onto the outer surface of the inner or fixed element as indicated at 23, thereby forming a dust seal between them and frictional holding and damping means against undesired relative movement due to mechanical vibration and/or acoustical feedback.

The sleeve 22 may be of thin plastic tubing stretched over the outer vane 14 and extending therebeyond sufficiently to constrict or contract, as shown by the portion 23, into full frictional contact with the inner element 15. If the sleeve is made of heat-shrinking tubing and of an inside diameter substantially the same as the outer diameter of the outer vane 14, it will shrink to form a seal and mechanical lock on the inner vane 15 when heat is applied.

The sleeve is thus carried by the outer capacitor element and has a free end 23 which extends beyond the surface of the outer element and into overlapping frictional and damping engagement with the outer surface of the inner capacitor element. It will be noted that a shoulder 24 is formed at the junction of the outer surface with the body of the element 5, as an abutment for the sleeve 22 at one inner end to aid in its placement for proper overhand and grip on the element 15 at the outer or free end 23.

A circuit connection terminal 25 is provided in connection with the base 10 of the fixed element 6. This may project through an opening 26 in the mounting means or printed circuit board 21, as shown, for connection in circuit with other elements. Likewise the capacitor element 5 is connected with a metallic or conductive ferrule or terminal means 27 mounted on the outer end of the tubular guide pin 8 and is soldered or otherwise connected, as indicated at 28, to an extension of the center guide rod 7 through the tubular pin 8. A terminal 29 on the ferrula 27 thus provides for external circuit connection through the rod 7 to the element 5 and its connected vane or vanes. The pin 8 serves to insulate the rod 7 from the element 6.

By way of example, a typical tuned circuit, for use with the capacitor 5–6, is shown schematically in connection with the terminals 25 and 29. This circuit comprises a variable tuning capacitor 31 connected in parallel with a fixed tuning inductor or winding 32 between the circuit terminals 33 and 34 which are connected through leads 35 and 36 respectively with the trimmer capacitor terminals 25 and 29. This places the trimmer capacitor in parallel with the variable tuning capacitor 31 and thus in shunt relation to the tuned circuit across the terminals 33–34. Signals are applied to the circuit inductor 32 through an input coupling winding 37 inductively coupled thereto in a typical coupling-transformer relation and connected with input circuit leads 38 from any suitable signal source. Output circuit leads 39 and 40, from the terminals 33 and 34 respectively, may be connected to any suitable utilization means as is understood, this circuit being shown only by way of example to illustrate one use for the capacitor 5–6.

From the foregoing description it will be seen that an improved normally-open type trimmer or variable capacitor, for tunable signal circuits and the like, may be constructed in accordance with the invention. Two concentric capacitor elements or sets of elements are provided and frictionally connected by a bridging sleeve of damping material carrier by the outer one and contacting the other or inner one. The concentric construction has the advantage that it increases the capacity and tuning range, and the cylindrical form tends to ad rigidity to the vanes and stability to the capacity adjustment.

This low-cost construction effectively seals out moisture and dust in an otherwise open capacitor and at the same time provides locking and damping means to prevent changes in adjustment due to vibration, acoustic feedback and the like. In other words an improved effectively-sealed and vibration-proof variable capacitor of relatively small size and of the concentric air-dielectric type is effectively provided at relatively low-cost, while at the same time it is adapted for a wide variety of uses including printed circuit board mounting with other components.

What is claimed is:

1. A capacitor, comprising in combination, outer and inner spaced concentric relatively-movable capacitor elements, and means for effectively preventing undesired relative movement of said capacitor elements including a bridging sleeve of insulating material frictionally gripping and connecting said elements and sealing the space therebetween.

2. A capacitor for adjusting the tuning of signal circuits, comprising in combination, outer and inner spaced concentric relatively-movable tuning elements, and means for effectively damping and preventing relative movement of said tuning elements due to vibration and acoustical feedback including a bridging sleeve of elastic insulating material carried by the outer element with one end overlapping and firmly frictionally gripping the inner element and sealing the space between said elements from moisture and dust.

3. A variable capacitor for tuned high frequency signal circuits, comprising in combination, outer and inner spaced capacitor plate elements relatively-movable in concentric overlapping relation for capacity variation and circuit tuning adjustment, and means for effectively damping and preventing relative movement of said elements due to vibration and acoustical feedback including a bridging sleeve of plastic material frictionally connecting said elements and sealing the space therebetween, said sleeve being stretched around and carried by the outer plate element and extending therefrom into firm frictional contact with the inner plate element by contraction about said element over a limited area.

4. A concentric-vane variable capacitor, comprising in combination, outer and inner spaced concentric capacitor elements intermeshed in overlapping relation and relatively movable longitudinally on a fixed axis to vary the extent of meshing and the capacity relation therebetween, and means sealing the space between said elements against moisture and dust and effectively damping and preventing relative movement of said capacitor elements due to vibration and acoustical feedback, said last named means including a contracting sleeve of relatively-thin elastic insulating material surrounding and gripping the outer one of said elements and extending therefrom into full sealing and frictional contact with the outer and inner one of said elements.

5. A variable capacitor of the concentric open type, comprising in combination, two spaced concentric capacitor elements intermeshed in overlapping relation and relatively movable longitudinally on a fixed axis to vary the extent of meshing and the capacity relation therebetween, means providing fixed circuit terminal connections with said elements, and unitary sealing and locking means for said capacitor elements including a contracting sleeve of relatively-thin elastic insulating material surrounding and gripping one of said elements and extending therefrom into sealing and frictional contact with the other of said elements.

6. A variable capacitor of the concentric open type comprising in combination, two conductive capacitor elements having cylindrical outer vanes intermeshed in overlapping closely-spaced concentric relation and relatively movable longitudinally with the respective capacitor elements on a fixed axis to vary the extent of meshing and the capacity relation therebetween, means providing fixed circuit terminal connections with said elements and the respective vanes, and unitary sealing and locking means for said capacitor including an elongated sleeve of relatively-thin elastic insulating material surrounding and gripping one of said vanes over a major area thereof and extending therefrom into sealing and frictional contact with the other of said vanes over a lesser area thereof, thereby to form a dust seal and frictional holding and damping means between said elements.

7. A variable capacitor of the concentric open type comprising in combination, two concentric cylindrical multi-vane capacitor elements movable in intermeshed overlapping spaced relation to vary the effective capacity therebetween, means providing fixed circuit terminal connections with said elements and vanes thereof, and means for effectively damping and preventing relative movement of said capacitor elements due to vibration and acoustical feedback including a bridging sleeve of damping material frictionally gripping and connecting the outer vanes of said elements and sealing the space therebetween.

8. A variable capacitor of the concentric open type comprising in combination, two concentric cylindrical multi-vane capacitor elements movable in intermeshed overlapping spaced relation to vary the effective capacity therebetween, means providing fixed circuit terminal connections with said elements and vanes thereof, and a contracting sleeve of relatively thin elastic insulating material surrounding and gripping the outer vane of one of said elements and extending therefrom into sealing and frictional contact with the outer vane of the other of said elements thereby to form a unitary locking and damping means between said elements against undesired relative movement tending to disturb the capacity adjustment thereof.

References Cited by the Examiner
UNITED STATES PATENTS 2,510,694  6/50  Griffiths et al. _____ 317—251
2,831,948  4/58  Fraser _____ 200—168

JOHN F. BURNS, *Primary Examiner.*

JOHN P. WILDMAN, *Examiner.*